United States Patent
Streete et al.

(10) Patent No.: US 9,576,332 B1
(45) Date of Patent: Feb. 21, 2017

(54) SYSTEMS AND METHODS FOR REMOTE GRAPHICS PROCESSING UNIT SERVICE

(71) Applicant: VCE Company, LLC, Richardson, TX (US)

(72) Inventors: Jonathan P. Streete, San Jose, CA (US); Jonathan Fontanez, Jacksonville, FL (US); Joshua L. Bonczkowski, Apex, NC (US)

(73) Assignee: VCE IP Holding Company LLC, Richardson, TX (US)

( * ) Notice: Subject to any disclaimer, the term of this patent is extended or adjusted under 35 U.S.C. 154(b) by 57 days.

(21) Appl. No.: 14/293,377

(22) Filed: Jun. 2, 2014

(51) Int. Cl.
*G06F 15/16* (2006.01)
*G06T 1/20* (2006.01)

(52) U.S. Cl.
CPC ........................................ *G06T 1/20* (2013.01)

(58) Field of Classification Search
CPC ............... G06F 9/45558; G06F 2009/4557; G06F 9/45533; G06F 9/4445; G06F 9/4856; G06F 3/1462; G06F 9/5044; G06T 2200/16
See application file for complete search history.

(56) References Cited

U.S. PATENT DOCUMENTS

| 2013/0093776 A1* | 4/2013 | Chakraborty | G06F 9/505 345/520 |
| 2013/0155083 A1* | 6/2013 | McKenzie | G06T 1/20 345/522 |
| 2014/0215462 A1* | 7/2014 | Kuo et al. | G06F 9/45533 718/1 |

* cited by examiner

Primary Examiner — Hau Nguyen
(74) Attorney, Agent, or Firm — Polsinelli PC (57) ABSTRACT

Aspects of the present disclosure involve systems and methods for providing remote graphics processing unit (GPU) availability to one or more computing components of a data center. In particular, the present disclosure provides the remote location of one or more GPUs within a computing environment for use by one or more computing devices within the computing environment. Thus, each computing device may utilize the remotely located GPUs to perform the tasks of the computing device associated with a GPU, without the need for the GPU to be located within the computing device itself or within the same rack of the computing device. In this manner, one or more GPUs of a computing environment may provide GPU services to any number of computing devices, even though the GPUs are remote from the computing devices.

17 Claims, 5 Drawing Sheets

SYSTEMS AND METHODS FOR REMOTE GRAPHICS PROCESSING UNIT SERVICE

TECHNICAL FIELD

Aspects of the present disclosure relate to configuration of various computing components, among other functions, and more particularly to providing remote graphics processing unit (GPU) availability to one or more computing components of a computing environment.

BACKGROUND

Graphic Processing Units (GPUs) are becoming increasingly important to many server applications, particularly for performing Virtual Desktop Infrastructure (VDI) and big data analysis implementations. However, providing and consuming GPUs in a computing environment creates a unique set of issues, particularly in a highly agile, virtualized environment. GPUs are typically not available for blade server type arrangements of computing environments, generally requiring organizations to implement non-standard rack-mount servers alongside their blade servers to provide the GPU services for the computing environment. Further, GPUs are expensive investments, so an organization will often deploy GPUs to a selective subset of their servers such that workloads requiring GPU support have to be specifically scheduled on those rack-mount servers that are provisioned with GPUs. However, this reduces flexibility of workload deployment, and once a virtualized workload has started running on a particular server, it is pinned to the server, and cannot be migrated to an alternate server for performance or power management reasons. Furthermore, even though a typical server may be capable of hosting a hundred or more VDI sessions, a GPU dependency for a VDI workload will often reduce this capability to around 30 sessions, resulting in a substantial reduction in the efficiencies of the VDI capability.

SUMMARY

Implementations described and claimed herein address the foregoing problems, among others, by providing systems and methods for a computing system. The computing system includes at least a first networking device connected to a network and configured to host a virtual machine, the first networking device comprising an intercept driver program configured to intercept a graphics processing unit (GPU) call from the virtual machine and a second networking device connected to the network, the second networking device comprising at least one GPU and an intercept driver target program, the intercept driver target program configured to receive a communication from the intercept driver program on the network. The communication from the intercept driver comprises a representation of the GPU call from the virtual machine and wherein the second networking device executes the GPU call on the at least one GPU to provide GPU services to the virtual machine over the network.

DETAILED DESCRIPTION

Aspects of the present disclosure involve systems and methods for providing remote graphics processing unit (GPU) availability to one or more computing components of a computing system. In particular, the present disclosure provides the remote location of one or more GPUs which may be within a computing environment, for use by one or more computing devices within the computing system. In one particular embodiment, the computing system may be deployed in a computing system. Thus, each computing device, such as a blade server, can utilize the remotely located GPUs to perform the tasks of the computing device associated with a GPU, without the need for the GPU to be located within the computing device itself or within the same rack of the computing device. Further, the computing device may be unaware of the remote location of the utilized GPU such that the computing device is not required to alter the calls to the utilized GPU. In this manner, one or more GPUs of a computing environment may provide GPU services to any number of computing devices, even though the GPUs are remote from the computing devices.

By providing a system and method for remote GPU services, several advantages may be obtained. For example, remote location of the GPUs allows for mounting of the GPUs in a purpose-built enclosure using a network fabric rather than a PCI bus, enabling the use of blade-type compute systems for the main applications. In addition, remote location of the GPUs allows a GPU cage or rack to be located where there is adequate power and cooling for the GPUs. Also, because each GPU is accessible by each computing device and is not necessarily tied to a particular device, the remote GPU service system provides a "wait" feature of a GPU, enabling the originating computing device to be placed in a paused state, releasing the infrastructure resources while the GPU is processing data, and re-connecting the device to the selected GPU when the device is un-paused. Finally, for Virtual Desktop Infrastructure (VDI) applications, connecting the remote clients directly to the GPU avoids hair-pinning of the resulting display through the computing device hosting the VDI session, thereby reducing update latency.

The various systems and methods disclosed herein provide for remote GPU services in a computing environment context. However, it will be appreciated that, although some of the example implementations described herein involve a data center, the presently disclosed technology may be utilized in any computing or networking system or environment where at least one computing device utilizes at least GPU for processing. For example, aspects of the present disclosure may be integrated within a converged infrastructure. Generally speaking, converged infrastructures, also referred to as integrated infrastructure and other terms, involve multiple computing components pre-integrated into an optimized computing solution. The computing components of a converged infrastructure may include computer, storage, networking components and software for managing the integrated components. While some examples disclosed herein reference converged infrastructures, also sometimes referred to as unified computing systems, fabric-based computing systems, and dynamic infrastructures, systems and method described herein may be applied to other computing environments.

Figure 1A:
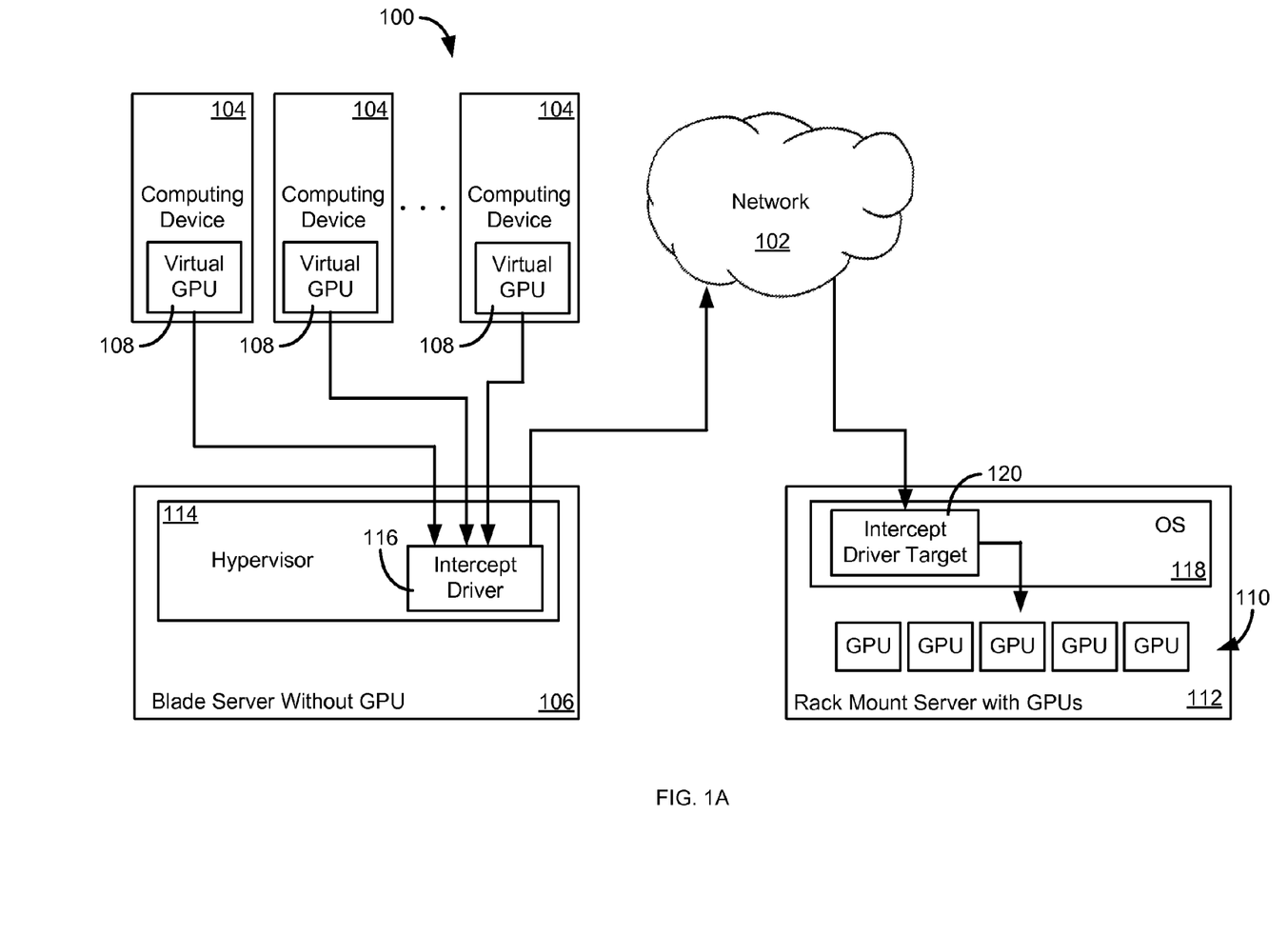
FIG. 1A illustrates a first example system for providing remote GPU services to a computing device, according to one implementation.

For a detailed description of an example system 100 for providing remote GPU services to one or more computing devices, reference is made to FIG. 1A. As depicted in FIG. 1A, the system 100 may be implemented in a computing environment or other computing or networking environment. Further, the system 100 includes at least one computing device 104 associated with a server 106 of the computing environment, such as a blade-type server. In one example, the computing devices 104 are virtual machines running on the server 106 and utilizing the server to perform one or more computations of the virtual machine. In other examples, the computing devices 104 may be laptops, personal digital assistants, or any other computing device that may utilize the performance of a GPU for computations. In one embodiment, these devices may connect directly to the rack mount server, as explained in more detail below with relation to FIG. 1B. In another embodiment, the computing devices 104 may be a converged infrastructure system, as described above.

To facilitate computations, each of the computing devices 104 may utilize a GPU in addition to a processor associated with the device. GPUs provide parallel processing capabilities for computing devices and are typically used by such devices to render the pixels of a display associated with the device and/or to perform massive data processing for the device. However, due to the nature of GPU design, GPUs often require direct connection to a Peripheral Component Interconnect (PCI) bus associated with the computing device. Also, GPUs often consume large amounts of power and expend large amounts of heat during use of the GPU. In virtual machines, the virtual machine may connect to a GPU of a server or other computing device that acts as the GPU for the virtual machine. However, blade-type servers 106, such as that shown in FIG. 1A, typically do not include a GPU. Thus, many computing environments will install a computing device with a GPU in the same rack or near the blade servers and host the virtual machines that utilize a GPU on that rack server instead. Such an arrangement typically provides a one-to-one relationship between virtual machine and utilized GPU or blade server and available GPUs. Thus, as explained above, computing environments will often deploy GPUs to a selective subset of their servers such that workloads requiring GPU support have to be specifically scheduled on those rack-mount servers that are provisioned with GPUs. However, this reduces flexibility of workload deployment, and once a virtualized workload has started running on a particular server, it is pinned to the server, and cannot be migrated to an alternate server for performance or power management reasons.

Alternative arrangements to such typical computing systems are now discussed. In particular, the present disclosure provides for remotely located GPUs to be used by the computing devices 104. This is illustrated in FIG. 1A as the virtual GPUs 108 associated with each computing device 104 of the system 100. Thus, while each blade server 106 may not have a physical GPU present within the computing device 104 to be used by the computing device, a virtual GPU 108 is available to each computing device through the system 100. In particular, each computing device 104 may be associated with one or more GPUs of an array of GPUs 110 embodied in a server 112 of the computing environment.

As explained in more detail below, each computing device 104 may utilize any number of the GPUs in the GPU array 110 such that more than one GPU may be associated with a single computing device. Communication between the computing devices 104 and the GPU array 110 is performed through a network 102 associated with the computing environment or between two or more computing environments. In such an environment 100, the network 102, which may be, without limitation, the Internet, an Intranet, an Ethernet network, a wired network, a wireless network, or the like, is used by one or more computing and/or data storage devices (e.g., one or more computing devices 104) for implementing the system 100. In another implementation, a single GPU 110 may simultaneously offer GPU functionality to two or more computing devices 104.

To facilitate the usage of a remote GPU from the GPU array 110 by one or more of the computing devices 104, the blade server 106 may utilize a hypervisor 114. In particular, an intercept driver 116 program of the hypervisor 114 is used to intercept calls or commands to a GPU from the computing device 104. In general, a hypervisor 114 is a software program operating on a host machine that creates and runs virtual machines, such as the computing device 104 of FIG. 1A. Another name for the computing device 104 of FIG. 1A may be a guest virtual machine being hosted by the host machine of the blade server 106. The hypervisor 114 program of the server 106 then runs the virtual guest machines 104 associated with the server. As explained in more detail below with relation to FIG. 2, the hypervisor 114 may include an intercept driver 116 program that is configured to intercept calls or commands to a GPU and transmit those commands through the network 102 to a rack mount server 112 that includes one or more GPUs available to the computing devices 104.

The rack mount server 112 of the system 100 includes the array of GPUs 110 and an operating system (OS) 118. The OS 118 is a computer program that is configured to manage the hardware and services of the rack mount server 112. In particular, the OS 118 includes an intercept driver target 120 program that is configured to receive the commands transmitted by the intercept driver 116 of the blade server 106. In other words, the intercept driver 116 transmits the commands over the network 102 to the intercept driver target 120 program. Once received, the OS 118 executes the commands to control the GPUs of the GPU array 110 associated with the rack mount server 112 to provide GPU services to the one or more computing devices 104 of the system 100.

As should be appreciated, the components illustrated in the system 100 of FIG. 1A are just some of the components that may be included in the system. For example, the network 102 may include any number of components to facilitate transmission of data and communications through the network, of which are not shown in FIG. 1A. Further, the computing environment discussed above may include many blade servers 106 hosting many computing devices 104, all or many of which may have access to the GPU array 110 of the rack mount server 112. However, for simplicity, the components of FIG. 1A are used to disclose the remote GPU services system 100.

Figure 1B:
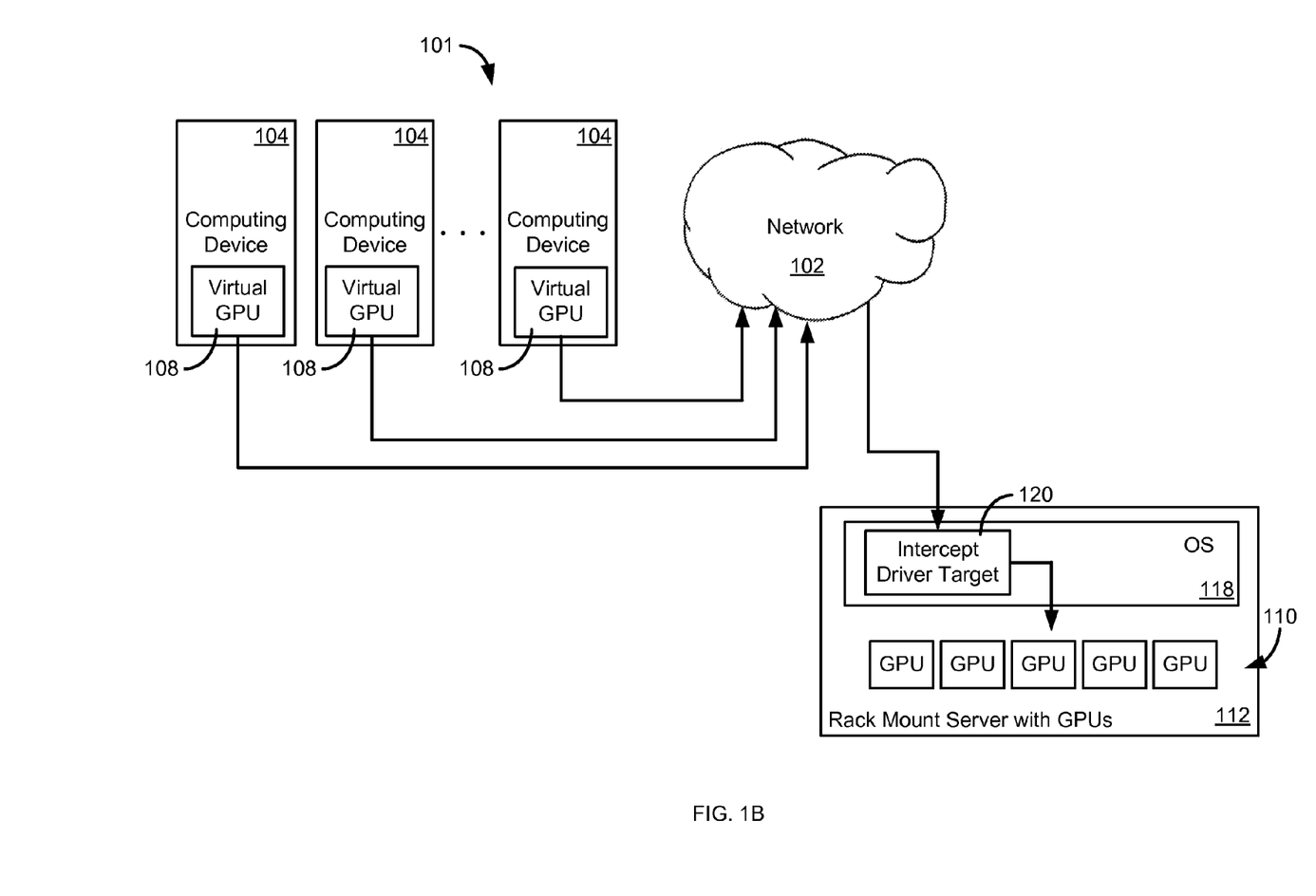
FIG. 1B illustrates a second example system for providing remote GPU services to a computing device, according to one implementation.

Another embodiment of the computing environment is illustrated in FIG. 2B. Many of the components in the environment 101 of FIG. 1B are similar or the same as the components illustrated in the environment 100 of FIG. 1A. Thus, the reference numbers associated with these components are similar from FIG. 1A to FIG. 1B. In addition, the operation of the components is also similar or the same as described above. However, in this environment 101, the computing devices 104 (such as laptop computers, personal digital assistants, etc.) connect directly to the network 102 instead of connecting through a blade server. Regardless of if the blade server 106 is executing a virtual machine 104 or one or more computing devices 104 connect directly to the network 102, the operations and features described herein remain.

Figure 2:
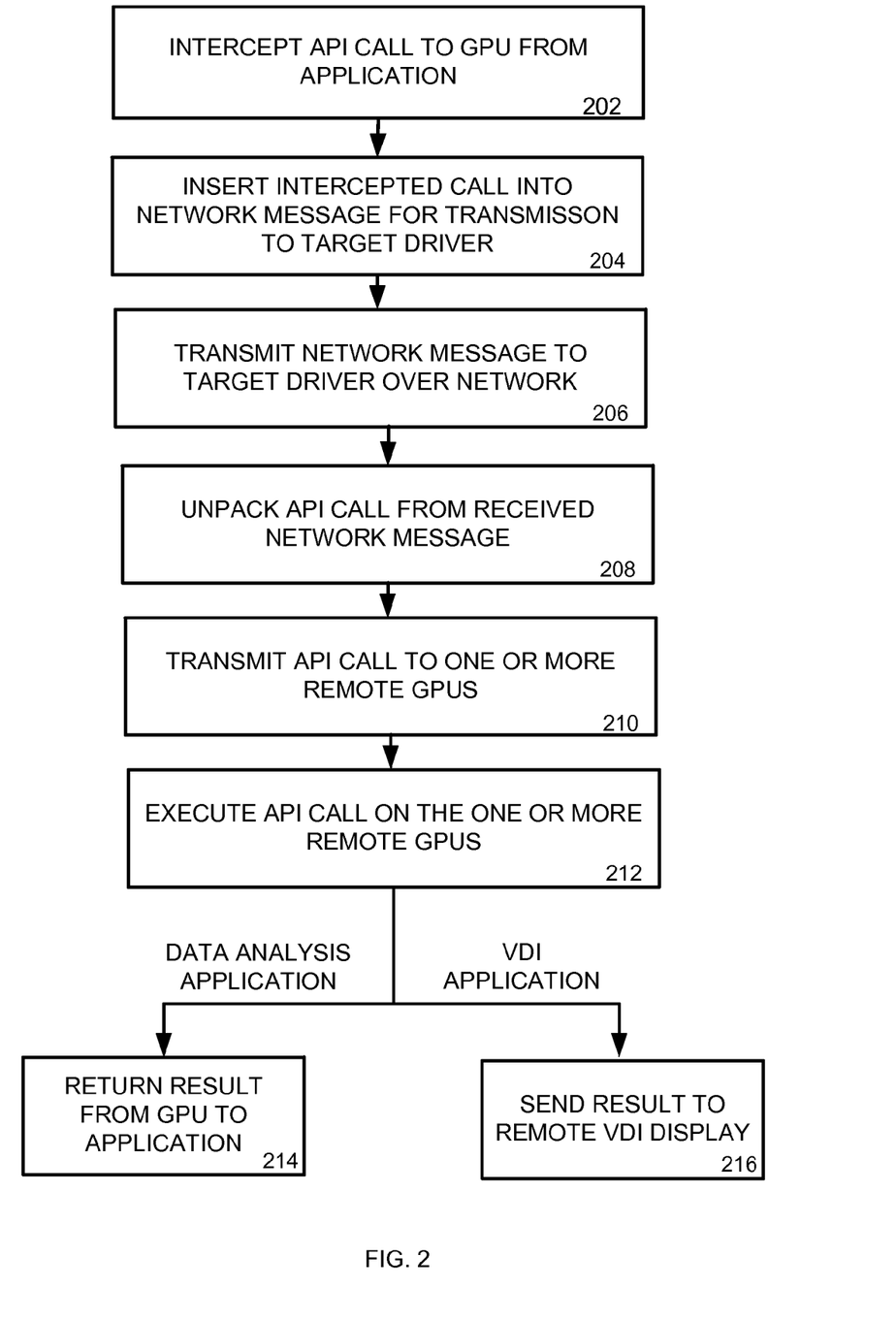
FIG. 2 illustrates example operations for providing remote GPU service to a computing device, according to one implementation.

FIG. 2 illustrates example operations for providing remote GPU service to a computing device, according to one implementation. In general, the operations of FIG. 2 are performed by one or more of the components of the system illustrated in FIG. 1. Through the operations of the flowchart, one or more of the computing devices 104 may utilize one or more of the remote GPUs 110 for performing GPU-type processes. Further, the operations of FIG. 2 may be performed through software, hardware or a combination of both software and hardware embodied within any of the components of the system 100 of FIG. 1. As such, the operations are described below with reference to both the method of FIG. 2 and the system 100 of FIG. 1.

Beginning in operation 202, the system 100 intercepts one or more application programming interface (API) calls to a GPU from an application being executed on one of the computing devices 104. In one embodiment, the intercept driver 116 program of the hypervisor 114 of the blade server 106 hosting the computing device 104 is configured to intercept the API call to the GPU. In other words, the program executed by the computing device 104 is configured to call a GPU associated with the computing device. Because the computing device 104 is being hosted by the blade server 106, this call is received by the hypervisor 114, and more specifically, by the intercept driver 116 program. In one embodiment, the intercept driver 116 program is a GPU driver for a market-available GPU modified to perform one or more of the operations of the method of FIG. 2. Thus, the API calls from the executing program of the computing device 104 may be typical calls to access a GPU from a computing device, without need for alteration of the API call. As such, the computing device 104 and/or executing program are unaware of the interception of the API call to the GPU.

In operation 204, the hypervisor 114 repackages the intercepted call to the GPU into a transmission message. The transmission message is configured to be transmitted through the network 102 to a destination address of a device connected to the network. In this particular example, the transmission message includes the destination address of the rack mount server 112 and the intercepted call to the GPU. Upon repackaging the intercepted call into the transmission message, the hypervisor 114 then transmits the message in operation 206 through the network 102 to the destination address of the message, namely the rack mount server 112.

The transmitted message including the intercepted command is received at the rack mount server 112 that includes the GPU array 110 in operation 208. In particular, an intercept driver target 120 program executed by the OS 118 of the rack mount server 112 with GPUs 110 receives the transmitted message from the network 102. In addition, the OS 118 (or intercept driver target 120 program) unpacks the received communication in operation 208 to obtain the command included in the message. Upon obtaining the intercepted command from the transmitted message, the OS 118 transmits the command to one or more GPUs of the GPU array 110 of the rack mount server 112 in operation 210. The one or more GPUs receiving the command are thus unaware that the command was received over the network 102.

In operation 212, the GPUs 110 that receive the command from the OS 118 execute the command. In other words, the one or more GPUs 110 execute the GPU call from the computing device 104 as if the GPUs are directly connected to a PCI bus of the computing device. Thus, through the operations of FIG. 2, remotely located GPU services may be provided to the computing devices 104. Also, information provided by the GPU in response to the received command may be transmitted back to the requesting computing device 104 across the network 102 in a similar manner, as shown in operation 214.

Through the remote GPU system and method described above, a computing environment may obtain several advantages over a traditional structure where the GPU for a computing device is directly connected or closely connected to the device. For example, remote location of the GPUs allows for mounting of the GPUs in a purpose-built enclosure rather than through a PCI bus, enabling the use of blade-type computing systems (which typically do not include a GPU) for the main applications. In addition, remote location of the GPUs allows a GPU cage or rack to be located where there is adequate power and cooling for the GPUs. Thus, a computing environment may locate the GPU cage near a cooling structure of the computing environment to alleviate the heat generation of the GPUs. Previous designs with a GPU in the same rack as the computing device may require additional cooling be provided to each rack individually.

In addition, through the system and method described above, a computing device 104 may utilize more than one GPU to process data. In particular, the OS 118 of the rack mount server 112 that includes the GPU array 110 may be configured or programmed to load balance or otherwise account for requests for the use of the GPUs. In some instances, the OS 118 may recognize that the more than one GPU 110 may be used in response to the request by the computing device 104. In such cases, the OS 118 may provide received commands to more than one of the GPUs of the GPU array 110 to accommodate the GPU request from the computing device. Because each GPU is available to each computing device 104 of the system 100 (rather than being in a one-to-one structure that is typical of computing devices), more than one GPU is available to the computing devices to execute GPU-related processes.

Further, one or more of the GPUs of the GPU array 110 may provide processing capabilities for multiple computing devices 104 simultaneously. For example, a single GPU may receive GPU instructions from a first computing device and a second computing device of the multiple computing devices 104 and execute those instructions to provide GPU processing capabilities for both devices. Also, these instructions may be executed by the GPU in an interwoven manner so that the processing is performed by the GPU without the need for one computing device 104 to wait until the processing on the first set of instructions is complete. Rather, it appears to the computing device 104 that the GPU is providing the GPU processing with little to no delay. In one embodiment, the interweaving of the instructions from the plurality of computing devices 104 is handled by the operating system 118 of the rack mount server 112. In particular, the operating system 118 may receive and schedule the GPU instructions from the computing devices 104 over the network 102 such that one GPU may provide GPU capabilities to multiple computing devices.

In VDI environments, the remote GPU service of the system and method may also provide reduced latency in updating the terminal screen of the VDI. In particular, connecting the remote clients directly to the GPU avoids hair-pinning of the resulting display through the computing device hosting the VDI session, thereby reducing update latency. The reduced latency may be obtained by configuring the intercept driver target 120 program to transmit screen updates performed by one or more the GPUs 110 directly to the VDI display terminal rather than back to the computing device 104 or other hosting machine, as illustrated in operation 216 of FIG. 2. In particular, the terminal of the VDI may be connected to the network 102 such that the screen updates performed by the remote GPU 110 may be packaged into a transmission message and transmitted by the OS 118 through the network 102 to the terminal. Bypassing sending the screen updates back to the hosting machine 106 may reduce the latency of the screen update processed by the remote GPU 110.

Figure 3:
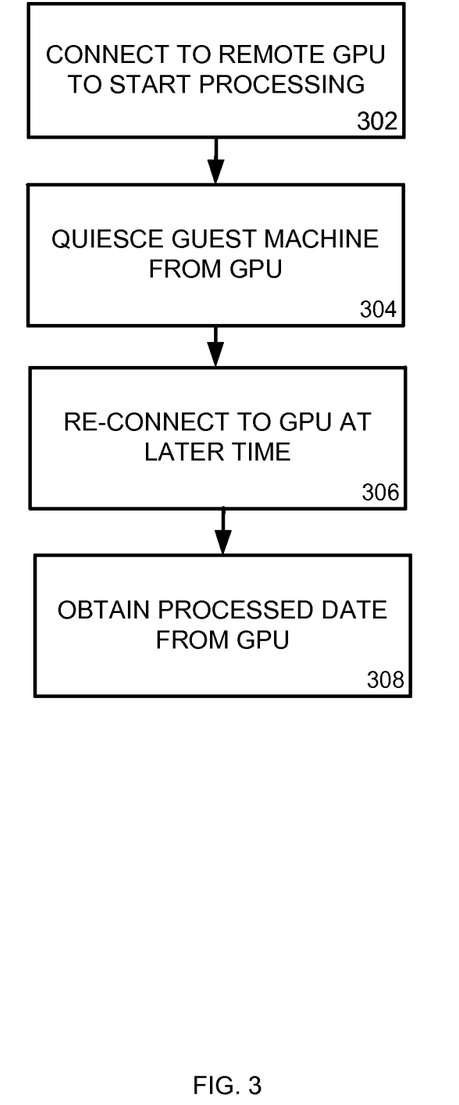
FIG. 3 illustrates example operations for releasing a guest machine during processing by a GPU, according to one implementation.

Another advantage utilized by the remote GPU service system 100 is described in the flowchart of FIG. 3. In particular, because each GPU is accessible by each computing device and is not necessarily tied to a particular device, the remote GPU service system provides a "wait" feature of a GPU, enabling the originating computing device to be placed in a paused state, releasing the infrastructure resources while the GPU is processing data, and re-connecting the device to the selected GPU when the device is un-paused. FIG. 3 illustrates example operations for releasing a guest machine during processing by a GPU, according to one implementation. In general, the operations of FIG. 3 are performed by one or more of the components of the system illustrated in FIG. 1. Further, the operations of FIG. 3 may be performed through software, hardware or a combination of both software and hardware embodied within any of the components of the system 100 of FIG. 1.

In general, the operations of FIG. 3 are performed by the system 100 for tasks that may run for a substantial time on one or more of the remote GPUs. Beginning in operation 302, the guest machine 104 connects to a remote GPU through the system and method described above. Further, the guest machine may transfer the data to be processed to the GPU. In operation 304, the remote GPU begins processing the task and the guest machine is quiesced. In one embodiment, the guest machine is quiesced using a pause feature of the hypervisor 114 of the hosting machine 106. By releasing the guest machine 104, the infrastructure resources associated with the guest machine may consumed by another workload. At some later time, the guest machine 104 may be un-paused and reconnected to the remote GPU in operation 306. Once reconnected, the guest machine 104 may obtain the results from the GPU processing from the remote GPU for the assigned task. In this manner, the originating computing device utilizing a remote GPU may be released to perform functions during the day and reconnect to the GPU to obtain the results processed by the GPU. For example, a financial modeling process, which may take 20 hours or more to process, can be started at night. However, the infrastructure used by the guest machine that began the modeling process can be used for other purposes during local daytime, and at night, the original guest machine can be un-paused to retrieve the results, and perhaps restart the task with a new dataset.

Figure 4:
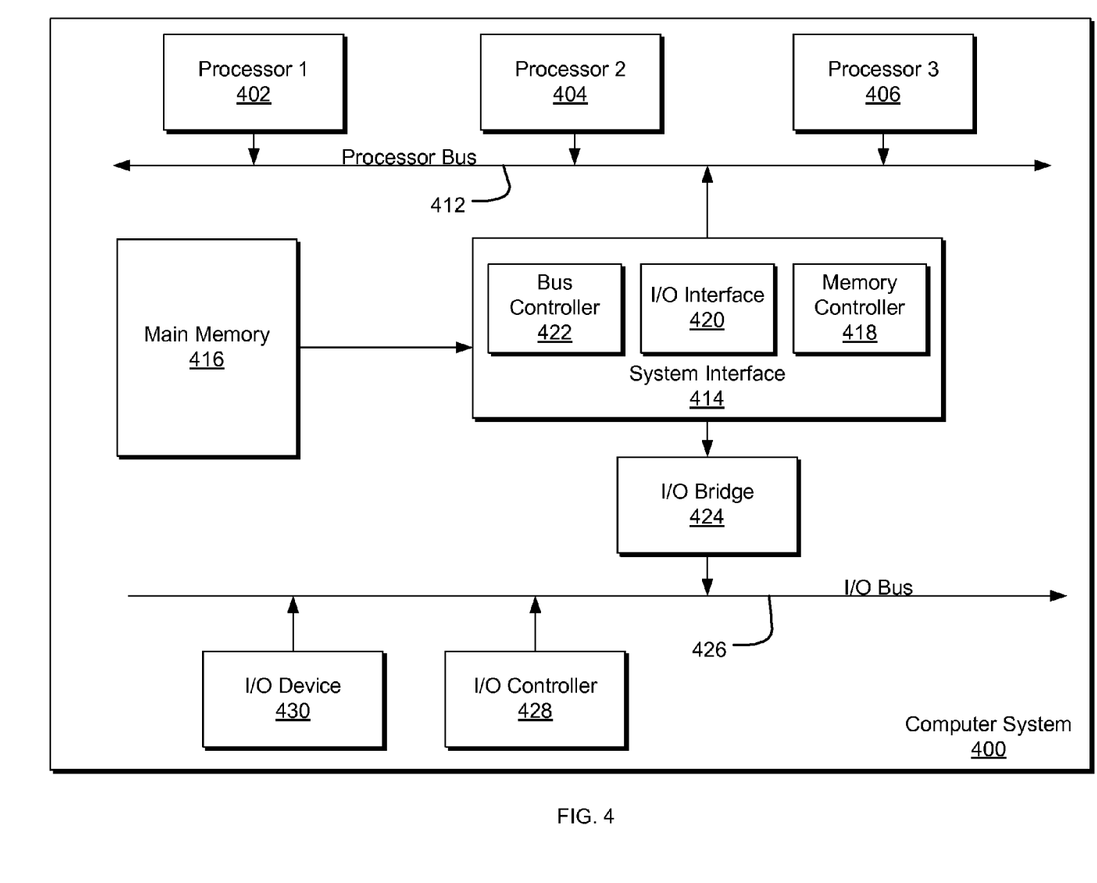
FIG. 4 shows an example computing system that may implement various systems and methods discussed herein, according to one implementation.

FIG. 4 is a block diagram illustrating an example of a computing device or computer system 400 which may be used in implementing the embodiments of the components of the system disclosed above. For example, the computing system 400 of FIG. 4 may be used to implement any of the various components of the remote GPU services system 100 discussed above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 414 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 440, as illustrated.

I/O device 440 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

We claim:

1. A computing system comprising:
    a first networking device connected to a network and configured to host a virtual machine, the first networking device comprising an intercept driver program configured to intercept a graphics processing unit (GPU) call from the virtual machine; and
    a second networking device connected to the network, the second networking device comprising at least one GPU and an intercept driver target program, the intercept driver target program configured to receive a communication from the intercept driver program on the network,
    wherein the communication from the intercept driver program comprises a representation of the GPU call from the virtual machine and wherein the second networking device load balances the GPU call among a plurality of GPUs and executes the GPU call on the plurality of GPUs to provide GPU services to the virtual machine over the network; and
    wherein the second networking device releases the virtual machine from the plurality of GPUs at a first time and provides the GPU services to the virtual machine over the network at a second time later than the first time by reconnecting the virtual machine to the plurality of GPUs, the execution of the GPU call on the plurality of GPUs occurring between the first time and the second time.

2. The computing system of claim 1 wherein the first networking device is a blade server of the computing system.

3. The computing system of claim 1 wherein the second networking device is a rack mount server comprising an array of GPUs.

4. The computing system of claim 1 wherein the intercept driver program is further configured to insert the intercepted GPU call from the virtual machine into a communication message, the communication message further comprising a target address of the intercept driver target program of the second networking device.

5. The computing system of claim 1 wherein the second networking device further comprises an operating system comprising the intercept driver target program and an array of GPUs.

6. A method for providing graphics processing unit (GPU) services to a virtual machine, the method comprising:
    intercepting a GPU call from the virtual machine at a host device, the host device configured to host the virtual machine;
    transmitting the intercepted GPU call from the virtual machine over a network;
    receiving the transmitted GPU call at an intercept driver target program of a computing device of a computing system, the computing device comprising an array of GPUs;
    executing the intercepted GPU call on a plurality of GPUs of the array of GPUs of the computing device of the computing system by load balancing the GPU call among the plurality of GPUs, wherein the plurality of GPUs provide a processing result upon executing the intercepted GPU call;
    releasing the virtual machine from the plurality of GPUs of the array of GPUs at a first time; and
    providing the processing result to the virtual machine over the network at a second time later than the first time by reconnecting the virtual machine to the plurality of GPUs, the execution of the intercepted GPU call on the plurality of GPUs occurring between the first time and the second time.

7. The method of claim 6 further comprising:
    converting the intercepted GPU call into a transmittable format; and
    inserting the converted GPU call into a communication packet.

8. The method of claim 7 wherein the communication packet comprises the converted GPU call and a destination address associated with the intercept driver target program.

9. The method of claim 8 wherein the destination address of the communication packet comprises an Internet Protocol (IP) address of the computing device.

10. The method of claim 6 wherein the processing result upon executing the intercepted GPU call comprises a screen update for a terminal device associated with the virtual machine.

11. The method of claim 10 wherein providing the processing result to the virtual machine over the network comprises transmitting the screen update to the terminal device associated with the virtual machine.

12. The method of claim 6 further comprising:
    packaging the processing results into a return communication message, the return communication message comprising the processing result and a destination address for the host device.

13. The method of claim 12 further comprising:
    transmitting the return communication message to the host device over the network.

14. The method of claim 6 further comprising intercepting a plurality of GPU calls from a plurality of virtual machines at the host device and wherein the intercepted GPU calls are executed on a single GPUs of the array of GPUs.

15. A non-transitory machine-readable medium encoded with instructions for providing graphics processing unit (GPU) services to a virtual machine, the instructions executable by a processor, comprising:
    receiving a transmitted GPU call at an intercept driver target program of a computing device, the computing device comprising an array of GPUs, the received transmitted GPU call comprising an intercepted GPU call from a virtual machine at a host device;

executing the intercepted GPU call on a plurality of GPUs of the array of GPUs of the computing device by load balancing the intercepted GPU call among the plurality of GPUs, wherein the plurality of GPUs provide a processing result upon executing the intercepted GPU call;

releasing the virtual machine from the plurality of GPUs of the array of GPUs at a first time; and transmitting the processing result to the host device over the network at a second time later than the first time by reconnecting the virtual machine to the plurality of GPUs, the execution of the intercepted GPU call on the plurality of GPUs occurring between the first time and the second time.

16. The machine-readable medium of claim 15, wherein the processing result upon executing the intercepted GPU call comprises a screen update for a terminal device associated with the virtual machine.

17. The machine-readable medium of claim 15, wherein the received transmitted GPU call comprises a conversion of the intercepted GPU call into a transmittable format and a destination address associated with the intercept driver target program.

* * * * *